United States Patent [19]
Huang et al.

[11] Patent Number: 6,138,274
[45] Date of Patent: *Oct. 24, 2000

[54] METHOD AND APPARATUS FOR UPDATING AN ONLINE COMPUTER PROGRAM

[75] Inventors: Yennun Huang, Bridgewater; Shalini Yajnik, Scotch Plains, both of N.J.

[73] Assignee: Lucent Technologies, Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 09/012,816

[22] Filed: Jan. 23, 1998

[51] Int. Cl.[7] ........................................ G06F 9/445
[52] U.S. Cl. ..................... 717/11; 717/1; 717/3; 717/9; 707/511
[58] Field of Search ........................ 395/712, 709; 717/1, 3, 11; 707/511

[56] References Cited

U.S. PATENT DOCUMENTS

| | | | |
|---|---|---|---|
| 5,596,706 | 1/1997 | Shimazaki et al. | 714/6 |
| 5,654,703 | 8/1997 | Clark, II | 341/51 |
| 5,768,597 | 6/1998 | Simm | 717/11 |
| 5,771,354 | 6/1998 | Crawford | 709/229 |
| 5,822,780 | 10/1998 | Schutzman | 711/165 |
| 5,845,077 | 12/1998 | Fawcett | 395/200.51 |
| 5,881,275 | 3/1999 | Peleg et al. | 395/564 |
| 5,951,694 | 9/1999 | Choquier et al. | 714/15 |
| 5,953,725 | 9/1999 | Eprahim et al. | 707/103 |

OTHER PUBLICATIONS

IBM Technical Disclosure Bulletin, "Chaining of Remote Procedure Calls in Distributed Computer Environment/Remote Procedure Call", vol. 36, No. 10, pp. 131–134, Oct. 1993.

Segal et al., "On–The–Fly Program Modification: Systems For Dynamic Updating", IEEE Software, pp. 53–65, Mar. 1993.

*Primary Examiner*—Tariq R. Haliz
*Assistant Examiner*—Ted T. Vo

[57] ABSTRACT

The computer programs in redundant, high-reliability systems can be updated in real-time, without a service outage by performing a memory-to-memory data transfer. Old data structures from the primary computer are assembled into a predetermined block of data that is transferred to the secondary, redundant computer. The organization of the transferred block of data is known by the second computer program which disassembles the block of data into new data structures required by the new computer program running on the redundant computer. The memory-to-memory data precludes any system outage attributable to lost data.

19 Claims, 1 Drawing Sheet

METHOD AND APPARATUS FOR UPDATING AN ONLINE COMPUTER PROGRAM

BACKGROUND OF THE INVENTION

Many computer controlled systems, such as telecommunication switching systems, aviation air traffic control, and banking and financial services impose stringent reliability and data availability constraints on computer platforms. Many of these applications require a system to be available 24 hours a day and 7 days a week (24×7 system availability). However, the 24×7 requirement cannot be achieved by hardware fault-tolerance alone. The software for these applications is usually very complex and, as a result, likely to contain faults or bugs.

Updating software programs to fix program bugs or adding new features to programs is a routine aspect of software controlled system evolution. Traditionally, computer controlled application availability and reliability has been improved by either tolerating software faults on-line or by taking the system off-line to remove software faults.

Even if a computer program has been designed to be bug-free and is bug free, updating a computer program to add new features, or to accommodate new hardware can affect system reliability. Without an on-line update mechanism, an application process typically has to be shut down during a software update and cannot render the services provided by the application. As a result, system availability might be lost during a software update.

A challenge in achieving 24×7 system availability is to provide the ability to perform on-line software updates so that the services provided by the application program need not be interrupted while the software update is in progress. A number of checkpointing libraries and tools exist that can checkpoint data between two processes, however, these tools assume that data structures in two different versions of a computer program are identical and hence, they cannot be used to update software where a later software version uses data structures different from an earlier version.

SUMMARY OF THE INVENTION

A method by which a computer program can be updated, on line, without causing a system outage would be an improvement over the prior art. In particular, a method and apparatus by which a switching system, like the Lucent Technologies No. 5 ESS can be updated without losing or dropping calls in progress during a software update would be an improvement over prior art software update methodologies.

This is achieved by a method for use in a cluster of computers, where a cluster is a network of computing nodes working together to provide highly available and scalable services the method being for updating a computer program while other processes are being executed. In the cluster, the method includes the steps of: 1) packing data stored in memory used by a first version of a computer program that is running on a first computer into a data stream while that program and other programs are executing on the first computer; 2) transferring the packed data in the data stream directly from memory of the first computer into the memory of a second computer while programmed processes are executing on the second computer; 3) unpacking the packed data in the data stream into the memory of the second computer into one or more data structures used by a second version of the computer program running on the second computer while the second version of the computer program, and other programs, are executing on the second computer. The foregoing steps are performed so that work, such as routing telephone calls to and from telephone subscribers, billing, and other tasks performed by the first and second versions of the computer program, are not disrupted although new work may be refused.

The method taught herein allows an update of the data to be made on-line, directly from the memory of one process or machine into the memory for another process or machine, even if data structure definitions are different and even if the data structures contain cycles and pointers to other data structures. Consequently, the inventive method is unlike the previous technologies which have to go through records stored on disk storage devices to perform an update, or which can only transfer the same data structures between memory. This method allows memory-to-memory transfers from one process or machine to another, even if the data structures are different between the two processes or machines.

Using the aforementioned process, the software in a computer controlled system can be updated without causing a system outage, even if data structures used in the two versions of the control program are different. In a cluster of computers like those used on the Lucent Technologies No. 5, ESS, as well as in other telephone switching systems, even in-progress calls are not dropped when system data base records are updated using the process disclosed herein. Data records of existing calls can be changed without losing calls that are being routed through the system.

DETAILED DESCRIPTION OF THE PREFERRED EMBODIMENT

Figure 1:
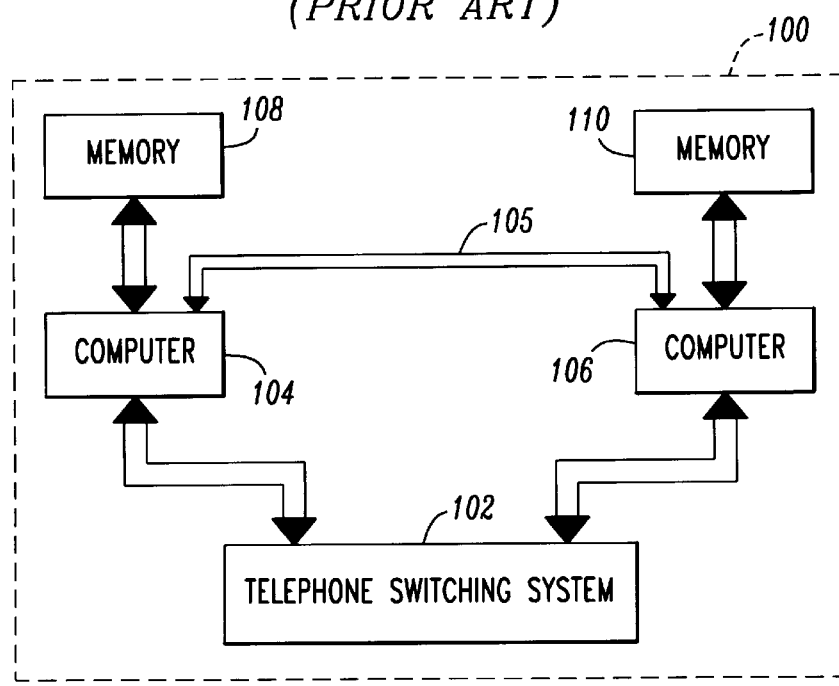
FIG. 1 shows a simplified block diagram of a computer controlled telephone switching system.

FIG. 1 shows a simplified block diagram of a two-computer network (100) that provides control to a telephone switching system (102). The computers (104, 106) in the network (10) are redundant in that one computer (104) acts as a back up to the second computer (106). Each computer executes a program stored in its own memory (108, 110). The programs stored in the computers' memories are ordinarily duplicate copies of the same program. The computers (104 and 106) are operatively coupled together by an appropriate data link (105) to provide the capability of exchanging data between the two computers (104, 106). A dedicated link, ethernet, or a local area network (LAN) could function as the data link (105) between the two computers (104, 106).

During the process of updating the computer program stored in memory (108), the first computer (104) is assigned the task of controlling the switching network using a first version of the system program stored in its memory (108). While the first computer (104) runs the telephone switching system (102) the contents of the memory (110) for the second computer (106) is overwritten with a new, second version of the system control program that is an updated version of the program running on the first computer (104). The second version of the system control program written into the memory (110) of the second computer (106) is ordinarily designed and written to at least preserve the functionality of the switching network after the program begins executing in the second computer (106). While the second version of the program will certainly use and require data, such data might be organized into different data structures from one version of the program to another. Stated differently, the second version of the program might use differently organized data structures than the first version of the program. No calls through the switching system are to be lost when the new program begins execution.

During the course of creating both versions of the new program, a specification file, not shown in FIG. 1, is created by the computer programmer who wrote each version of the system control program. The specification file in the new version of the program contains definitions of data structures used in both the old program (stored in the memory 108 for the first computer 104) and definition of data structures used in the new program. The specification files are used to map how and where data used in the old version of the program will be used in the new version of the program. Note, that the old version of the software has no knowledge of the data definitions of any new versions.

Data update from the first version of the program to the second version is performed by packing data from the first version of the program from the memory (108) of the first computer (104) into a data stream that is a series data bytes. This data stream is a series of bytes stored in memory (108) of the first machine (104).

The data stream is sent to the memory (110) of the computer (106) running the second or new version of the program. The second or new version of the program running on the second computer is written to include program routines that are capable of unpacking the data stream into data to be stored in the memory (110) of the second computer (106). The first machine (104) notifies the second machine (106) that the data stream has been copied whereupon the second machine (106) executes data unpacking routines. After the packed data files are unpacked into the machine with the new version of the program, the new version of the program can begin running using the newly loaded data without any service interruption, even if the organization of the data is structurally different.

Figure 2:
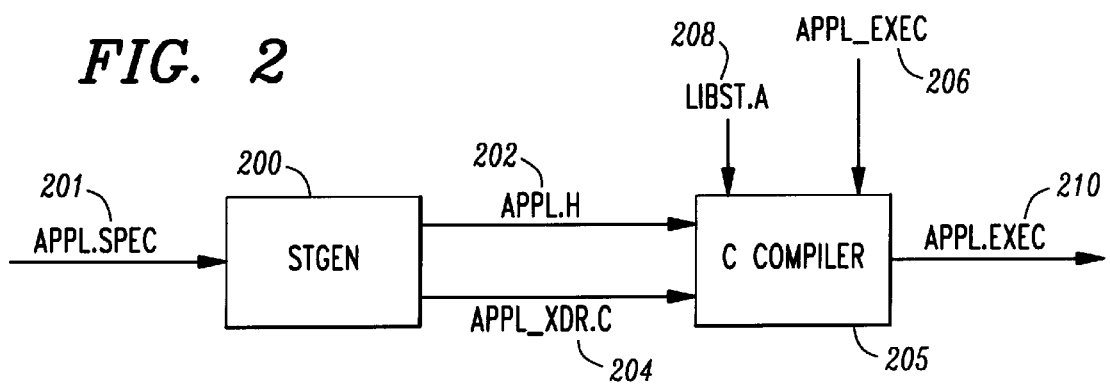
FIG. 2 shows a simplified block diagram of the functional elements of the computer program tool used to practice the method.

FIG. 2 shows a simplified functional block diagram showing the steps of the method. STGEN (200) is a computer program designed and written to accept as an input, the specification file of the second or new program, which in FIG. 2 is shown as APPL.SPEC (201). The specification file (201) of the new program defines the data structures used in the new version of the program. The specification file of the new program, also specifies the data structures used in the old version of the program. When STGEN (200) is run, it outputs two files: a header file, APPL.H (202) and a C programming language computer program, APPL_XDR.C (204).

The two outputs of STGEN, (200). APPL.H (202) and APPL_XDR.C, (204) are compiled (205) with the main computer program for the second computer, APPL.C, (206) and a library of routines used to pack and unpacking data streams, LIBST.A (208) using a C-language compiler (205) to produce an executable computer program APPL_EXEC (210). APPL_EXEC (210) is an application program that runs the main computer program in the second computer, and also unpacks data in the data stream. APPL_EXEC (210) calls routines in the library LIBST.A (208) that are used to unpack the data stream into data structures required by the second program.

Figure 3:
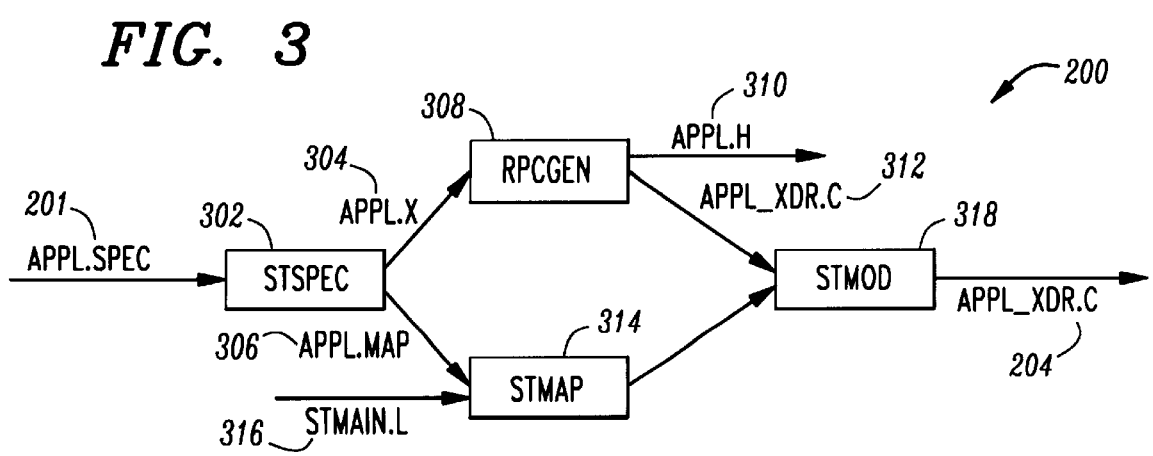
FIG. 3 shows a detailed data flow diagram of the computer program tool STGEN necessary to practice the method taught herein.

One implementation of the compiler STGEN is shown in FIG. 3.

The protocol compiler STGEN (200) reads the definitions of the application data structures from the specification file APPL.SPEC (201). STGEN (200) takes the specification file, APPL.SPEC (201) and parses it to generate routines to pack and unpack each data structure and each data type described in the specification file. STGEN (200) then produces a file that contains XDR routines to pack and unpack data structures. XDR routines are well-known standard routines used to exchange data between computers.

As shown in FIG. 3. STSPEC (302) first takes the specification file and generates two files: APPL.X (304) and APPL.MAP (306). The file APPL.X (304) contains definitions of the data structures, like the file APPL.SPEC (201). APPL.MAP (306) maps correspondence between new and old data structures used in the new and old programs respectively.

RPCGEN (308) is a compiler that accepts a specification file and generates well-known XDR routines. RPCGEN (308) produces two outputs: APPL.H (310) is a header file that contains declarations of the packing and unpacking functions; APPL_XDR.C (312) from RPCGEN (308) is a C-language program that contains XDR routines for packing and unpacking data. The APPL_XDR.C (312) program routine output from RPCGEN (308) contains routines for packing and unpacking data but cannot understand how to translate a data structure from one aversion of the control program to another.

STMAP (314) is a computer program that accepts two inputs: APPL.MAP, (306) which contains mapping between old and new data structures; STMAIN.L (316) is an externally-supplied lex file that is a list of rules used by STMAP (314) to parse the APPL.MAP (306) file to produce an executable output STMOD (318).

STMOD(318) takes as input APPL_XDR.C (312) and modifies it to add data translation ability to it to generate a C-language program of the same name, APPL_XDR.C but identified in FIG. 2 by reference numeral 204. As set forth above, APPL_XDR.C (312) is compiled with the to main control program, APPL.C, (206) the libraries, LIBST.A (208) and APPL.H (202) to produce APPL_EXEC (210).

LIBST.A (208) has two functions and four macros. The two functions are:
PACK(data-pointer, data-type); and
UNPACK(data_type).
The four macros include:
BEGIN-PACK(size, my-version, target-version, flag);
END-PACK(data-pointer)
BEGIN-UNPACK(data-pointer, size, my version, flag);
and END-UNPACK.

These functions and macros must be embedded in application programs for packing and unpacking data.

In the situation when we need to pack a number of related data structures are to be packed together, the BEGIN_PACK macro packs all data structures in one stream. The BEGIN_UNPACK macro unpacks the data structures. The flag parameter in the macros is used to specify if a data structure to be packed is SIMPLE or COMPLEX. A data structure is considered SIMPLE if it can be packed using standard XDR primitives, e.g. data structures which contain no cycles or cross-reference pointers. A data structure is considered to be COMPLEX if it contains a cycle or comprises of two or more cross referenced data structures, e.g. a double-linked fist, a circular list. a graph or two or more data structures which contain cross reference pointers.

Two exemplary specification files are shown.
The specification file for a first version of a program could look like:

```
typedef struct callstr *nlist;
struct substr {
        long            reg[80];
};
struct substr2 {
        long            reg[80];
};
struct callstr {
        struct  substr1         ch1;
        struct  substr2         ch2;
        int                     index;
        long                    value;
        nlist                   next;
};
```

The specification file for a second version of a file might then look like:

```
%OLDSPEC
typedef         struct  callstr   *nlist;
struct substr {
        long            reg[80];
};
struct substr2 {
        long            reg[80];
};
struct callstr {
        struct  substr1         ch1;
        struct  substr2         ch2;
        int                     index;
        long                    DUMMY;
        nlist                   next
};
%NEWSPEC
typedef struct  callstr  *nlist;
struct  substr1 {
        long            reg[120];
}
struct  substr2 {
        long            reg[80];
}
struct  callstr {
        struct  substr1         ch1;
        struct  substr2         ch2;
        int                     index;
        short                   newvalue;
        nlist                   next;
};
```

By way of example, let cp be of type nlist, i.e. it points to a data structure of type CALLSTR, not shown. We can pack the data present in the structure CALLSTR in the first version of the program by embedding the following code in the application program.

BEGIN_PACK(MAXSIZE, 0, 1, SIMPLE) { pack((char *) cp, "nlist")

} END_PACK(newp);

Packed data is stored as a byte array in a memory location pointed by the newp pointer.

To unpack a data structure in the new version of a program, we use the UNPACK(data_type) function. When the unpacking is done, the unpack( ) function returns a pointer to the unpacked data structure. The unpacks function is used with the BEGIN-UNPACK(data-pointer, size, my version, flag) and END-UNPACK macros. As in the previous example, the second or new version of the program unpacks the callstr data structure received from the first or old version of the program by calling the function:

BEGIN_UNPACK(datap, MAXSIZE, 1, SIMPLE) { cp=unpack("nlist");

} END_UNPACK;

where variable datap points to the block of data received from the first or old version of the program. After returning from the function call, the variable cp points to the unpacked calistr data structure.

By the foregoing method, a complex computer program can be updated on-line, without system outage. In a telecommunications switching system calls in progress are not lost before, during or after the update process is executed. Even if the new version of the computer program uses different data structures, the telecommunications system can be updated without loss of service.

Copying data from one data structure to another without loss of switching system functionality is a significant technical challenge. When executable instructions of a program are changed as the program evolves, the structure and organization of data files used by the program might also change. Keeping data from one version of a program to be used in another version of program preserves the state of the program while the program is being updated. In the preferred embodiment of the invention, the two computers shown in FIG. 1 (104, 106) are Lucent Technologies 3B processors used in the Lucent Technologies #5 ESS Switch. In such an application, the random access memories of the two. 3B processors are ordinarily linked by a data link (105) to permit the program data that resides in the memory of the processors to be updated so that the data in one machine matches the data in the other. Those skilled in the art will recognize that redundant processors other than the 3B processor in a #5 ESS switch might be similarly linked and that data might be exchanged using any appropriate serial or parallel data link (105) and using any appropriate transmission media such as copper, fiber optic cable, or even wireless networks. In addition, the data link (105) might include an intermediate data transfer point, such as another computer, a switching system, or data storage device such as RAM, magnetic tape or disk. Actual data transfer could be accomplished serially or in parallel.

During the process of updating the program that the processors run on, i.e., the executable instructions, a first set of data (not shown) resident in the random access memory (108) of the first computer (104) is to be copied into the random access memory (110) of the second computer (106) on a real-time, non-service interrupting basis. Such copying could extend to files stored on disk resources or on magnetic tape, if an appropriate communications link is established between the corresponding media.

What is claimed is:

1. A method for use in a network of redundant computers which control a telecommunications switching system for routing calls, said network of redundant computers including at least (i) a first computer having a program memory and executing a first computer program version that uses a first set of data base structures and (ii) a second computer having a program memory and executing a second computer program version that uses a second set of data base structures different from said first set of data base structures, said first and said second computers being coupled together, said method being for updating said second set of data base structures from said first set of data base structures and comprising the steps of:

a) packing data, of said first set of data base structures in the memory of said first computer, into a data stream;

b) transmitting over a link said data stream from the memory of said first computer to the memory of said second computer; and c) unpacking said data stream in said second computer to form said second set of data base structures in the memory of said second computer, said second set of data base structures being organizationally different from said first set of data base structures, so that the second set of data base structures within the program memory of said second computer is updated from the first set of data base structures within the program memory of said first computer, wherein said unpacking said data stream includes the steps of:

d) reading data from said data stream to form at least one data base structure; and e) copying said data from said at least one data base structure into the program memory of said second computer;

the method pack, transmit, unpack being characterized in that no work performed by said first computer program version and second computer program version is disrupted.

2. The method of claim 1 wherein said steps a), b), and c) are performed while said first and second computers continue to perform work within said telecommunications system.

3. The method of claim 1 wherein said packing data, of said first set of data base structures in the memory of said first computer, into said data stream includes the step of copying memory contents containing a data base structure into a data stream.

4. The method of claim 1 wherein said packing data, of said first set of data base structures in the memory of said first computer, into said data stream includes the step of copying data into a series of bytes having a predetermined order.

5. The method of claim 1 wherein said packing data, of said first set of data base structures in the memory of said first computer, into said data stream includes the step of copying data into a series of bytes having a predetermined order according to a first specification file.

6. The method of claim 1 wherein said unpacking said data stream to form said second set of data base structures in the memory of said second computer includes the step of copying data from said data stream into predetermined locations in memory.

7. The method of claim 1 wherein said unpacking said data stream to form said second set of data base structures in the memory of said second computer includes the step of copying data from said data stream into predetermined locations of memory according to a second specification file.

8. In a computer network coupled to and controlling a telephone switching network routing calls, said computer network comprised of a first computer having a first memory, running a version of a computer program and using a first set of data, a second computer having a second memory, running a version of said computer program and using a second set of data, a data network for updating said second set of data with said first set of data and that includes an apparatus comprised of:

means for packing said first set of data into a data stream within said first computer;

means for transferring said data stream from said first computer to said second computer;

means for unpacking said data stream into the memory of said second computer, wherein said means for unpacking said data stream into the memory of said second computer comprises means for reading data from said data stream to form at least one data base structure, and wherein said means for unpacking said data stream into the memory of said second computer comprises means for copying said data from said at least one data base structure into the program memory of said second computer; and means for updating said second set of data with said first set of data, a structure for said second set of data being organizationally different from a structure for said first set of data;

wherein calls are routable through said telephone switching network before and after said second set of data is updated with said first set of data.

9. The apparatus of claim 8 wherein said means for packing said first set of data into said data stream within said first computer is comprised of a random access memory device.

10. The apparatus of claim 8 wherein said means for transferring said data stream from said first computer to said second computer includes a processor controlling said telephone switching network.

11. The apparatus of claim 8 wherein said means for transferring said data stream from said first computer to said second computer is comprised of a serial data communication link.

12. The apparatus of claim 8 wherein said means for transferring said data stream from said first computer to said second computer is comprised of a parallel data communication link.

13. The apparatus of claim 8 wherein said means for unpacking said data stream into the memory of said second computer comprises a random access memory device.

14. A computer network coupled to and controlling a telephone switching network routing calls, said computer network comprised of a first computer having a first memory, running a first version of a computer program and using a first set of data, a second computer having a second memory, running a second version of said computer program and using a second set of data, a data network for updating said second set of data with said first set of data and that includes an apparatus comprised of:

a first processor packing said first set of data, in the memory of said first computer, into a data stream within said first computer;

a data link transferring said data stream from the memory of said first computer to the memory of said second computer; and a second processor unpacking said data stream into the memory of said second computer to update said second set of data, a structure for said second set of data being organizationally different from a structure for said first set of data, such that calls are routable through said telephone switching network before and after said second set of data is updated with said first set of data, wherein said second processor unpacking said data stream into the memory of said second computer to update said second set of data comprises:

a processor that reads data from said data stream to form at least one data base structure; and a processor that copies said data from said at least one data base structure into the program memory of said second computer.

15. The apparatus of claim 14 wherein said first processor packing said first set of data into said data stream within said first computer comprises a random access memory device.

16. The apparatus of claim 14 wherein said data link transferring said data stream from the memory of said first computer to the memory of said second computer includes a processor controlling said telephone switching network.

17. The apparatus of claim 14 wherein said data link is comprised of a serial data communication link.

18. The apparatus of claim 14 wherein said data link is comprised of a parallel data communication link.

19. The apparatus of claim 14 wherein said second processor unpacking said data stream into the memory of said second computer comprises a random access memory device.

* * * * *